US009846541B2

(12) United States Patent
Miyamoto et al.

(10) Patent No.: US 9,846,541 B2
(45) Date of Patent: Dec. 19, 2017

(54) MEMORY SYSTEM FOR CONTROLLING PERFORAMCE BY ADJUSTING AMOUNT OF PARALLEL OPERATIONS

(71) Applicant: Toshiba Memory Corporation, Minato-ku, Tokyo (JP)

(72) Inventors: Hironobu Miyamoto, Yokohama Kanagawa (JP); Maoko Oyamada, Yokohama Kanagawa (JP); Kenichiro Suzuki, Yokohama Kanagawa (JP); Yoshihisa Kojima, Kawasaki Kanagawa (JP)

(73) Assignee: Toshiba Memory Corporation, Tokyo (JP)

( * ) Notice: Subject to any disclaimer, the term of this patent is extended or adjusted under 35 U.S.C. 154(b) by 0 days.

(21) Appl. No.: 14/656,498

(22) Filed: Mar. 12, 2015

(65) Prior Publication Data

US 2016/0170642 A1 Jun. 16, 2016

Related U.S. Application Data

(60) Provisional application No. 62/090,766, filed on Dec. 11, 2014.

(51) Int. Cl.
*G06F 3/06* (2006.01)

(52) U.S. Cl.
CPC ............ *G06F 3/061* (2013.01); *G06F 3/0625* (2013.01); *G06F 3/0655* (2013.01); *G06F 3/0679* (2013.01)

(58) Field of Classification Search
CPC ...... G06F 3/061; G06F 3/0625; G06F 3/0679; G06F 3/0655
See application file for complete search history.

(56) References Cited

U.S. PATENT DOCUMENTS

| 7,415,625 | B2* | 8/2008 | Wyatt | G06F 1/206 |
| | | | | 318/471 |
| 8,266,256 | B2 | 9/2012 | Eldering | |
| 2004/0215996 | A1* | 10/2004 | Kanamori | G11C 29/02 |
| | | | | 713/600 |
| 2006/0288241 | A1* | 12/2006 | Felter | G06F 1/3203 |
| | | | | 713/300 |
| 2007/0211551 | A1* | 9/2007 | Yogev | G11C 16/30 |
| | | | | 365/226 |
| 2011/0258367 | A1* | 10/2011 | Tanaka | G06F 1/3203 |
| | | | | 711/103 |
| 2012/0023346 | A1* | 1/2012 | Byom | G06F 1/3225 |
| | | | | 713/320 |

(Continued)

FOREIGN PATENT DOCUMENTS

| JP | 2012-533821 A | 12/2012 |
| JP | 2013-140979 A | 7/2013 |

*Primary Examiner* — Rocio Del Mar Perez-Velez
(74) *Attorney, Agent, or Firm* — White & Case LLP

(57) ABSTRACT

A memory system according to an embodiment includes a non-volatile memory and a controller configured to control the non-volatile memory. The controller includes an interface and a control unit. The interface receives, from a host, a first instruction to change a performance of the memory system as a performance control instruction. The control unit controls the memory system on the basis of the performance control instruction such that the number of parallel operations of parallel operating units which are operated in parallel in the memory system is changed.

16 Claims, 9 Drawing Sheets

| | NUMBER OF PARALLEL OPERATIONS | | |
|---|---|---|---|
| PRESET VALUE | CPU | NAND MEMORY | ... |
| $P_1$ | 4 | 2 | |
| $P_2$ | 2 | 2 | |
| $P_3$ | 4 | 4 | |
| ⋮ | ⋮ | ⋮ | |

45B

(56) References Cited

U.S. PATENT DOCUMENTS

| | | | |
|---|---|---|---|
| 2012/0047320 A1* | 2/2012 | Yoo | G06F 3/0616 |
| | | | 711/103 |
| 2013/0169347 A1 | 7/2013 | Kim et al. | |
| 2013/0305008 A1* | 11/2013 | Kwon | G06F 13/1689 |
| | | | 711/167 |
| 2014/0101371 A1* | 4/2014 | Nguyen | G06F 3/0616 |
| | | | 711/103 |
| 2014/0215244 A1 | 7/2014 | Hong | |
| 2014/0365714 A1* | 12/2014 | Sweere | G06F 12/0246 |
| | | | 711/103 |
| 2015/0301744 A1* | 10/2015 | Kim | G06F 3/061 |
| | | | 711/103 |

* cited by examiner

| AVAILABLE RESOURCE NAME | AVAILABLE RESOURCE ID | NUMBER OF PARALLEL OPERATIONS |
|---|---|---|
| CPU | 001 | $N_1$ |
| NAND MEMORY | 002 | $N_2$ |
| CHANNEL | 003 | $N_3$ |
| BANK | 004 | $N_4$ |
| VOLATILE MEMORY | 005 | $N_5$ |
| PROCESS | 006 | $N_6$ |
| ⋮ | ⋮ | ⋮ |

| | NUMBER OF PARALLEL OPERATIONS | | |
|---|---|---|---|
| PRESET VALUE | CPU | NAND MEMORY | ... |
| $P_1$ | 4 | 2 | |
| $P_2$ | 2 | 2 | |
| $P_3$ | 4 | 4 | |
| ⋮ | ⋮ | ⋮ | |

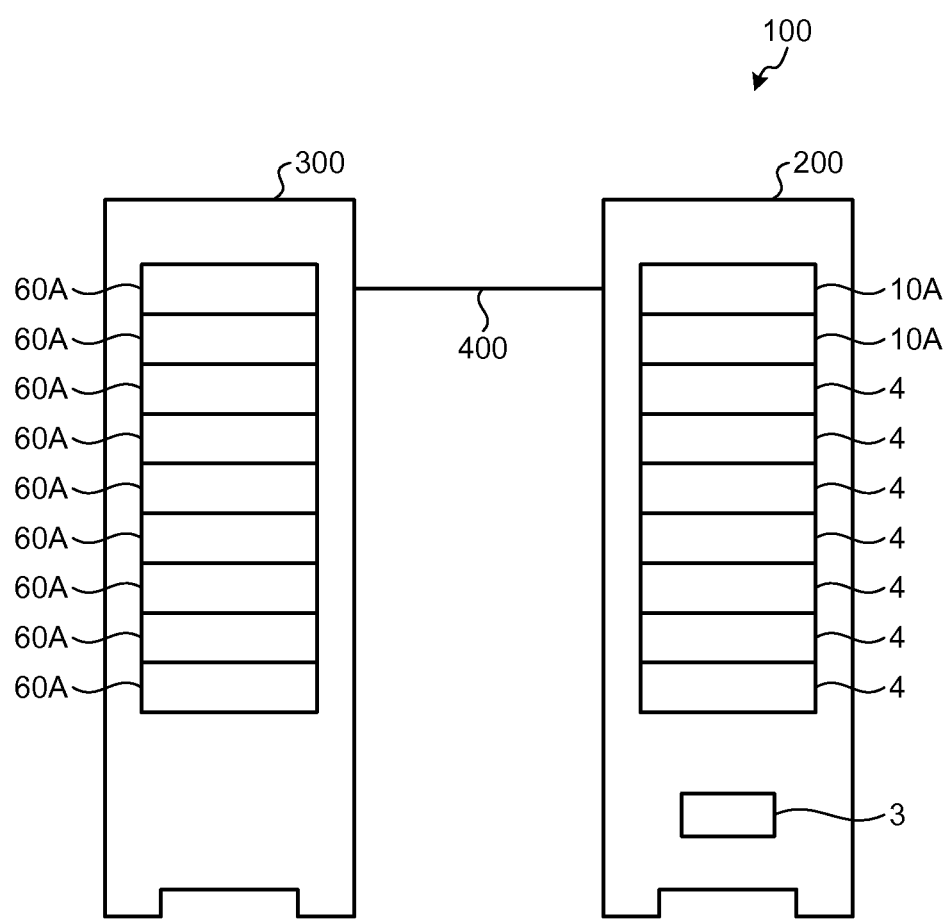

MEMORY SYSTEM FOR CONTROLLING PERFORAMCE BY ADJUSTING AMOUNT OF PARALLEL OPERATIONS

CROSS-REFERENCE TO RELATED APPLICATIONS

This application is based upon and claims the benefit of priority from U.S. Provisional Application No. 62/090,766, filed on Dec. 11, 2014; the entire contents of which are incorporated herein by reference.

FIELD

Embodiments described herein relate generally to memory systems.

BACKGROUND

In some cases, drives with different performances are mounted in storage server systems of the same model, each of which includes a host and a drive that is a memory system. However, when the drives with different performances are mounted, in some cases, the storage server systems of the same model have different system performances. Therefore, it is preferable to easily change the performance of the drive.

BRIEF DESCRIPTION OF THE DRAWINGS

FIG. 4 is a diagram illustrating an example of the structure of resource usage information according to the first embodiment;

FIG. 5 is a diagram illustrating an example of the structure of a preset value table according to the first embodiment;

FIG. 12 is a diagram illustrating an example of the mounting of the memory system.

DETAILED DESCRIPTION

According to an embodiment, a memory system is provided. The memory system includes a non-volatile memory and a controller configured to control the non-volatile memory. The controller includes an interface and a control unit. The interface receives a first instruction to change the performance of the memory system as a performance control instruction from a host. In addition, the control unit controls the memory system on the basis of the performance control instruction such that the number of parallel operations of parallel operating units which are operated in parallel in the memory system is changed.

Hereinafter, memory systems according to embodiments will be described in detail with reference to the accompanying drawings. The invention is not limited by the embodiments. In each of the following embodiments, a case in which a memory system is a solid state drive (SSD) will be described. The memory system may be a drive, such as a hard disk drive (HDD), other than the SSD.

First Embodiment

Figure 1:
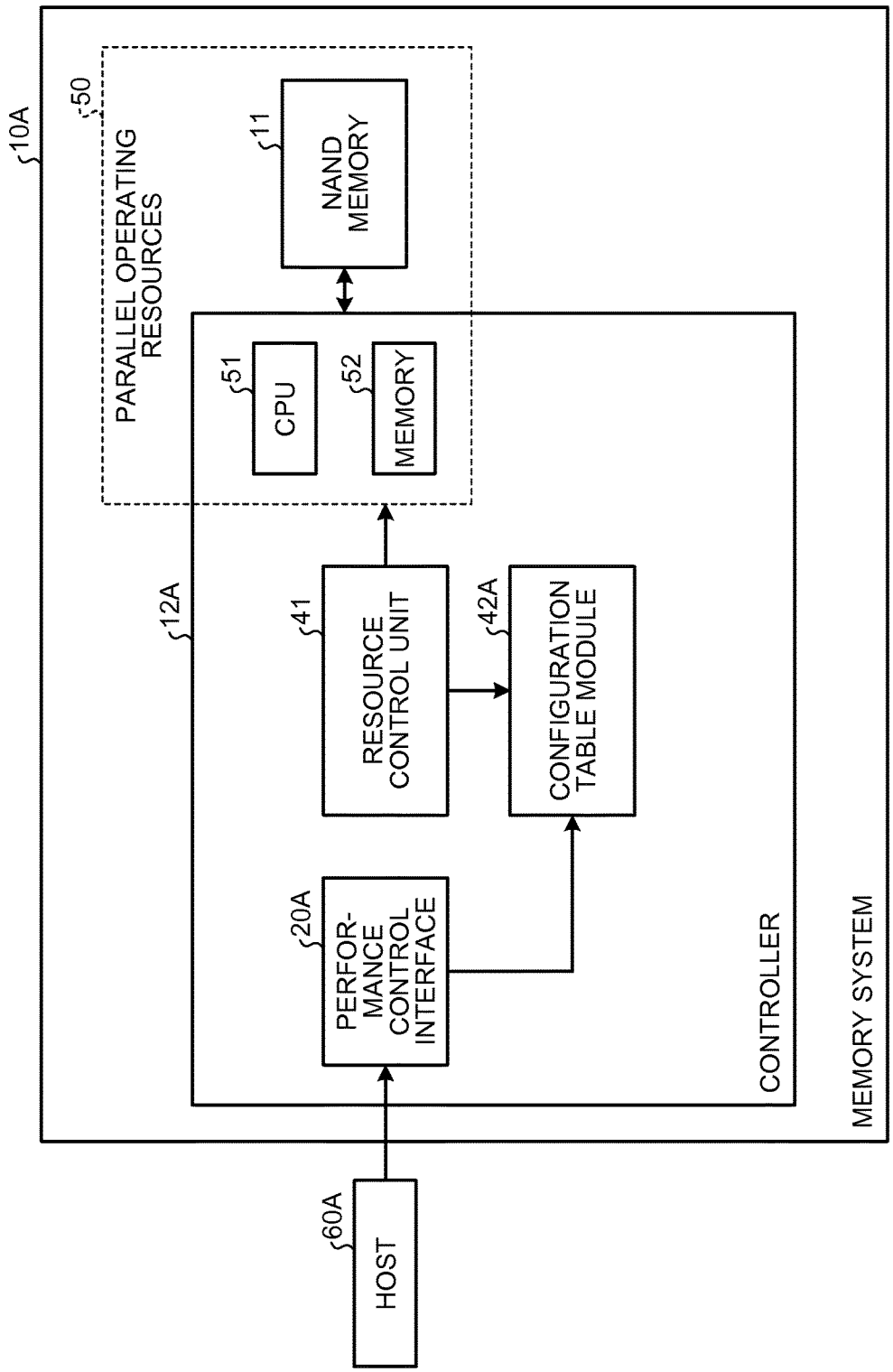
FIG. 1 is a diagram illustrating an example of the structure of a memory system according to a first embodiment.

FIG. 1 is a diagram illustrating an example of the structure of a memory system according to a first embodiment. A storage server system according to the first embodiment includes a host 60A and a memory system 10A. The memory system 10A is connected to an external device such as the host (host computer) 60A. The memory system 10A according to this embodiment controls resources (for example, a CPU and a memory) which can be operated in parallel on the basis of an instruction from the host 60A. The memory system 10A adjusts (throttles) the performances (for example, the number of parallel operations) of the resources which can be operated in parallel and operates at the performance corresponding to the instruction from the host 60A.

The memory system 10A includes a NAND memory 11 and a controller 12A. The NAND memory 11 is a storage medium that can store information in a non-volatile manner. The NAND memory 11 is a NAND flash memory which is an example of a recordable non-volatile memory.

The controller 12A controls the NAND memory 11. For example, the controller 12A writes data to the NAND memory 11 or reads data from the NAND memory 11 in response to a command from the host 60A. The controller 12A includes a performance control interface (IF) 20A, a resource control unit 41, and a configuration table module 42A. In addition, the controller 12A includes a CPU 51 and a memory 52.

The resources (parallel operating resources 50) which can be operated in parallel according to this embodiment are, for example, components forming the memory system 10A and programs forming software. The parallel operating resources 50 include, for example, the following (1) to (4):

(1) A component or a program that performs information processing between the memory system 10A and the host 60A;

(2) A component or a program that performs information processing between the controller 12A and the NAND memory 11;

(3) A component or a program that performs information processing in the controller 12A; and (4) A component or a program that performs information processing in the NAND memory 11.

Specifically, the parallel operating resources 50 are, for example, the CPU 51, the memory 52, and the NAND memory 11. In this embodiment, a case in which the parallel operating resources 50 are, for example, the CPU 51, the memory 52, and the NAND memory 11 will be described. The CPU 51 may perform the operation of the resource control unit 41. In addition, the configuration table module 42A may be provided in the memory 52.

In this embodiment, the performances of the resources are, for example, a data read/write speed, the amount of data which is read or written, and an access patterns such as sequential and random. Specifically, the performances of the resources are, for example, the number of parallel operations, data storage capacity, an information processing speed, and the amount of information processed. In addition, examples of the information processing include arithmetic processing, a data writing process, a data reading process, and a communication process.

Although not illustrated in FIG. 1, the CPU 51 is connected to the performance control interface 20A, the resource control unit 41, the configuration table module 42A, and the memory 52. Therefore, the performance control interface 20A is connected to the configuration table module 42A through the CPU 51. In addition, the performance control interface 20A is connected to the host 60A. The resource control unit 41 is connected to the parallel operating resources 50 and the configuration table module 42A.

The performance control interface 20A receives an instruction related to performance control (hereinafter, referred to as a performance control instruction) transmitted from the host 60A. Specifically, the performance control interface 20A receives, as the performance control instruction, a combination of information indicating the use resources used for operations (information for identifying use resources) (hereinafter, referred to as an available resource ID) and the number of resources for each use resource (the number of parallel operations). In the performance control instruction, for example, the type of use resource (available resource ID) and the number of parallel operations to be changed are designated. Hereinafter, in some cases, a combination of the available resource ID and the number of parallel operations is referred to as resource limit information.

In addition, the performance control interface 20A receives, for example, information (a preset value which will be described below) indicating the combination of the available resource ID and the number of parallel operations or a performance index. When receiving the performance control instruction, the performance control interface 20A transmits the performance control instruction to the CPU 51.

The configuration table module 42A stores various information tables (corresponding information). In each of the information tables, a control method corresponding to the performance control instruction is set. Each of the information tables is set for each memory system 10A. The configuration table module 42A stores, for example, resource usage information 45X or a performance index table 45C, which will be described below. The resource usage information 45X is an information table storing the resource limit information of the resources which are actually used. The memory system 10A operates on the basis of the set resource usage information 45X. In the performance index table 45C, the performance index and the available resource ID are associated with each other.

When receiving the performance control instruction, the CPU 51 refers to the information table corresponding to the performance control instruction among the information tables stored in the configuration table module 42A. For example, when receiving the performance index as the performance control instruction, the CPU 51 refers to the information table (performance index table 45C) corresponding to the performance index. The CPU 51 determines the use resource on the basis of the performance index table 45C and the performance index. The CPU 51 stores the available resource ID of the determined use resource in the resource usage information 45X. As such, when receiving the performance control instruction, the CPU 51 updates the resource usage information 45X.

The resource control unit 41 controls the parallel operating resources 50 on the basis of the resource usage information 45X. The resource control unit 41 changes, for example, the number of parallel operations of the parallel operating resources 50. For example, when the NAND memory 11 is designated in the resource usage information 45X, the resource control unit 41 limits the operation of the NAND memory 11.

The memory 52 is, for example, a volatile memory. The memory 52 functions as a write buffer that stores data transmitted from the host 60A in temporary until the data is written to the NAND memory 11. In addition, the memory 52 functions as a storage area for storing and updating management information related to the memory system 10A and a work area for temporarily storing the data read from the NAND memory 11.

Figure 2:
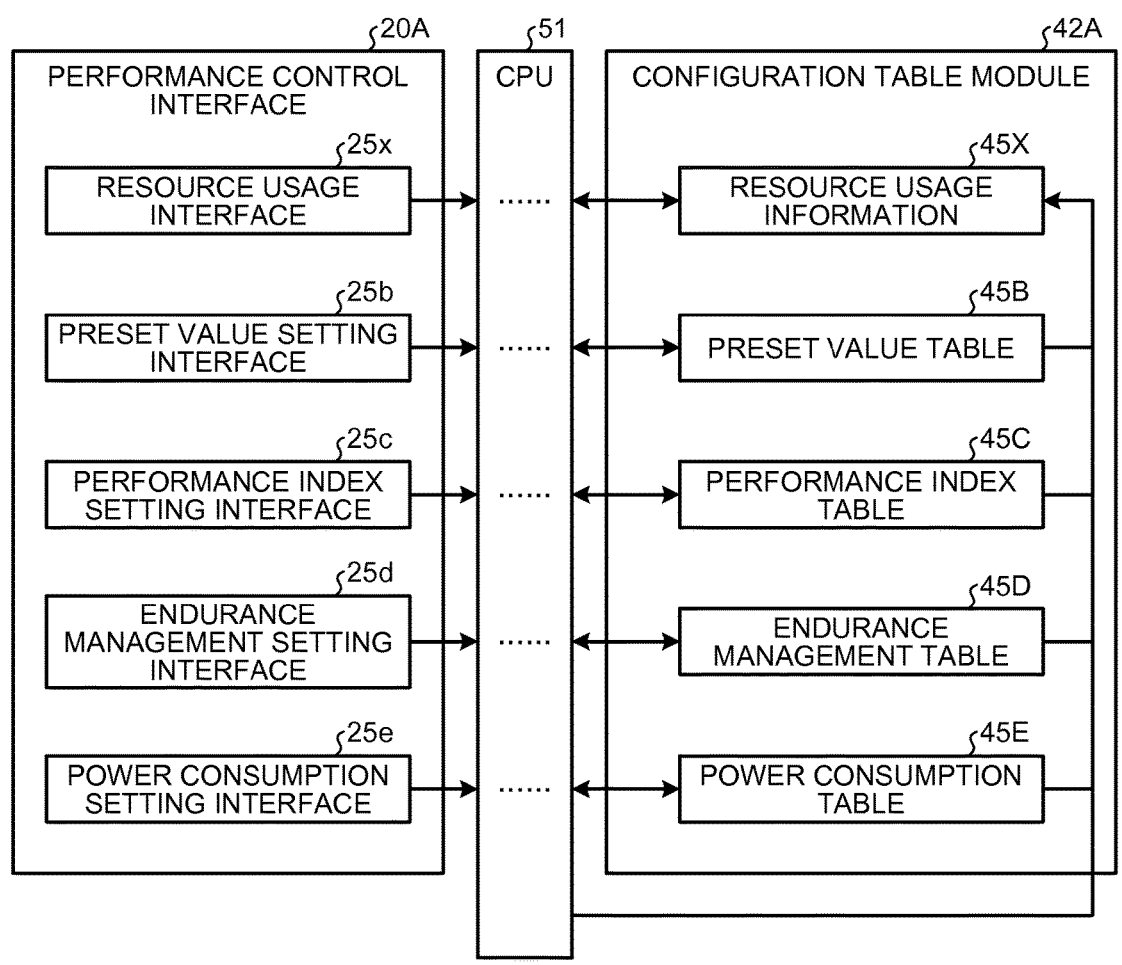
FIG. 2 is a diagram illustrating an example of the structure of a performance control interface and a configuration table module according to the first embodiment.

Next, the structure of the performance control interface 20A and the configuration table module 42A will be described. FIG. 2 is a diagram illustrating the structure of the performance control interface and the configuration table module according to the first embodiment. The CPU 51 is connected to the performance control interface 20A and the configuration table module 42A.

The performance control interface 20A includes a resource usage interface 25x, a preset value setting interface 25b, a performance index setting interface 25c, an endurance management setting interface 25d, and a power consumption setting interface 25e.

The configuration table module 42A stores the resource usage information 45X, a preset value table 45B, the performance index table 45C, an endurance management table 45D, and a power consumption table 45E.

The resource usage information 45X is changed during the operation of the memory system 10A in response to a request from the host 60A. The preset value table 45B, the performance index table 45C, the endurance management table 45D, and the power consumption table 45E may be set in advance, for example, upon shipment of the memory system 10A, or they may be changed in response to an instruction from the host 60A.

The resource usage interface 25x receives the resource limit information (the maximum value of the performance required for the memory system 10A) transmitted from the host 60A and transmits the resource limit information to the CPU 51. The available resource ID in the resource limit information is information for identifying the resource of which parallel operations (simultaneously executed operations) is limited by an instruction from the host 60A. The number of parallel operations in the resource limit information indicates the number of the resources allowed to work in parallel indicated by the available resource ID is operated in parallel. Therefore, when the available resource ID and the number of parallel operations (the number of use resources) are designated, the type and the number of resources of which parallel operation is limited are designated. The CPU 51 registers the resource limit information in the resource usage information 45X.

The resource usage information 45X stores information related to the resource of which parallel operation is limited. Specifically, the resource usage information 45X stores the resource limit information (the combination of the available resource ID and the number of parallel operations) of the resource of which parallel operation is limited. When the parallel operation of a plurality of resources is limited, a plurality of sets of resource limit information is stored in the resource usage information 45X.

The preset value setting interface 25b receives the preset value transmitted from the host 60A and transmits the preset value to the CPU 51. The preset value indicates a combination of the use resource (available resource ID) and the number of parallel operations under typical conditions. In this embodiment, when the preset value is designated, the use resource and the number of parallel operations are designated.

In the preset value table 45B, the preset value and the resource limit information of the resource of which parallel operation is limited are associated with each other. For example, a preset value "001", a channel, the number of channels, a bank, and the number of banks are associated with each other. In this case, when the preset value "001" is designated by the host 60A, the operation of the channels and the banks is limited to the number of channels and the number of banks corresponding to the preset value "001".

The performance index setting interface 25c receives the performance index transmitted from the host 60A and transmits the performance index to the CPU 51. The performance index is information for designating the performance of the memory system 10A. In other words, the performance index is the performance of the memory system 10A requested by the host 60A.

Examples of the performance index include input/output per second (LOPS), megabyte per second (MB/s), read/write, and random/sequential. The LOPS is the number of reading or writing operations for the NAND memory 11 per second. In addition, MB/s is the communication speed between the host 60A and the NAND memory 11.

In the performance index table 45C, the performance index (the type of performance and a target range) and the resource limit information of the resource of which parallel operation is limited are associated with each other. Specifically, in the performance index table 45C, the type of performance index, the target range of the performance index, and the resource limit information are associated with each other. For example, in the performance index table 45C, MB/s which is the type of performance index, 2000 MB/s to 2400 MB/s which is the range of the performance index, a channel, and the number of channels are associated with each other. In this embodiment, since the target range of the performance index is designated, for example, a performance error is allowed in a predetermined range.

The endurance management setting interface 25d receives endurance information transmitted from the host 60A and transmits the endurance information to the CPU 51. The endurance information is information (minimum endurance) about the endurance of the memory system 10A or the NAND memory 11 requested by the host 60A. In the endurance information, for example, a period, such as one year, three years, or five years, is designated.

While the memory system 10A is being used, the reliability of each block of the NAND memory 11 deteriorates. Therefore, in the NAND memory 11, the number of blocks (defective blocks or bad blocks) which are not available as the storage areas or the number of areas (bad areas) from which data is not read due to a large number of errors increases. For example, when the number of bad blocks or the error rate during a reading operation is greater than a predetermined value, it is determined that the endurance of the memory system 10A has ended.

The endurance of the memory system 10A may be determined on the basis of information other than the number of bad blocks. For example, the endurance of the memory system 10A may be determined on the basis of the number of writing operations, the number of erasing operations, the number of write errors, the number of erasing errors, and the command response time of the NAND memory 11.

The host 60A may transmit, for example, the number of bad blocks, the number of bad clusters, the number of writing operations, the number of erasing operations, the number of write errors, the number of erasing errors, and the command response time of the NAND memory 11 as the endurance information to the memory system 10A.

In the memory system 10A, when the host 60A writes data to the NAND memory 11, the operation mode may be changed, depending on, for example, the number of bad blocks. As the operation mode of the memory system 10A, there are the following two modes as well as the normal mode:

A read only (RO) mode: the memory system 10A does not receive a writing operation from the host 60A, performs the writing operations initiated the drive by itself (for example, management information, statistical information, refresh, compaction, and wear leveling). The memory system 10A changes to the RO mode, for example, when the number of bad blocks or the error rate during a reading operation is equal to or greater than a predetermined value; and A write protected (WP) mode: the memory system 10A prohibits all processes involving the writing of data to the NAND memory 11. In the WP mode, same as in RO mode, the NAND memory 11A returns an error message in response to all write requests from the host 60A such that data is not written. Further in the WP mode, the memory system 10A stops the writing operations initiated the drive by itself. Therefore, when the endurance of the memory system 10A is close to 0%, the NAND memory 11A can secure the data written from the host 60A as much as possible. The memory system 10A changes to the WP mode, for example, when the number of bad blocks or the error rate during a reading operation is not less than a predetermined value.

The host 60A may transmit transition conditions to the above-mentioned operation mode to the memory system 10A, instead of the endurance information. For example, the host 60A may transmit a first threshold value of the number of bad blocks or the error rate during a reading operation as transition conditions to the RO mode to the memory system 10A. In addition, the host 60A may transmit a second threshold value of the number of bad blocks or the error rate during a reading operation as WP mode to the memory system 10A.

In the endurance management table 45D, the endurance information and the resource limit information of the resource of which parallel operation is limited are associated with each other. The memory system 10A operates such that a normal operation (for example, a reading operation or a writing operation) can be performed during the minimum endurance defined by the endurance information.

The host 60A monitors the amount of data written to the NAND memory 11 in the memory system 10A. Then, the host 60A limits the amount of data written to the NAND memory 11 on the basis of the amount of data written to the NAND memory 11. For example, the host 60A may predict the endurance of the memory system 10A on the basis of, for example, the history of the amount of data written to the NAND memory 11. In this case, the host 60A voluntarily limits the amount of data written to the NAND memory 11 on the basis of the predicted endurance.

The power consumption setting interface 25e receives power consumption information from the host 60A and transmits the power consumption information to the CPU 51. The power consumption information is information about the maximum power consumption of the memory system 10A allowed by the host 60A. As the power consumption, for example, 9 W (watt) or 10 W is designated. In the power consumption table 45E, the power consumption information and the resource limit information of the resource of which parallel operation is limited are associated with each other.

In the memory system 10A, for example, power consumption varies depending on workload (for example, the amount of information processed) or an environment (for example, temperature). In this embodiment, the host 60A designates the maximum allowable power consumption of the memory system 10A. The power consumption information may be the amount of power consumption.

When receiving the resource limit information, the CPU 51 registers the resource limit information in the resource usage information 45X. In addition, when receiving the preset value, the CPU 51 selects the resource limit information corresponding to the preset value from the preset value table 45B and registers the selected resource limit information in the resource usage information 45X.

When receiving the performance index, the CPU 51 selects the resource limit information corresponding to the performance index from the performance index table 45C and registers the selected resource limit information in the resource usage information 45X. In the memory system 10A, there is a correlation between the performance and the amount of heat generated. Therefore, in the performance index table 45C, the amount of heat generated and the resource limit information are associated with each other. In the memory system 10A, the resource limit information corresponding to the performance index is selected and the performance and the amount of heat generated are controlled.

The performance index setting interface 25c may receive a performance control instruction indicating the amount of heat generated. In this case, information indicating the correspondence between the amount of heat generated and the resource limit information is stored in the performance index table 45C. When receiving the performance control instruction indicating the amount of heat generated, the CPU 51 selects the resource limit information corresponding to the amount of heat generated from the performance index table 45C and registers the selected resource limit information in the resource usage information 45X.

When receiving the endurance information, the CPU 51 selects the resource limit information corresponding to the endurance information from the endurance management table 45D and registers the selected resource limit information in the resource usage information 45X. When receiving the power consumption information, the CPU 51 selects the resource limit information corresponding to the power consumption information from the power consumption table 45E and registers the selected resource limit information in the resource usage information 45X.

The resource control unit 41 controls the parallel operating resource 50 on the basis of the resource limit information registered in the resource usage information 45X. The resource control unit 41 simultaneously drives a first use resource and a second use resource. The resource control unit 41 operates, for example, the first use resource with the first number in parallel and operates the second use resource with the second number in parallel.

Each information table stored in the configuration table module 42A is set for each memory system 10A. The resource usage information 45X is updated using, for example, each information table stored in the configuration table module 42A. Therefore, the resource control unit 41 controls the parallel operating resources 50 on the basis of the information corresponding to the host memory system 10A and the performance control instruction.

In some cases, a plurality of limits (a performance index, an endurance, and power consumption) are transmitted to the resource usage interface 25x. In this case, the CPU 51 selects the resource limit information corresponding to the most strict limitation among the resource limit information items corresponding to each limit and registers the selected resource limit information in the resource usage information 45X.

Figure 3:
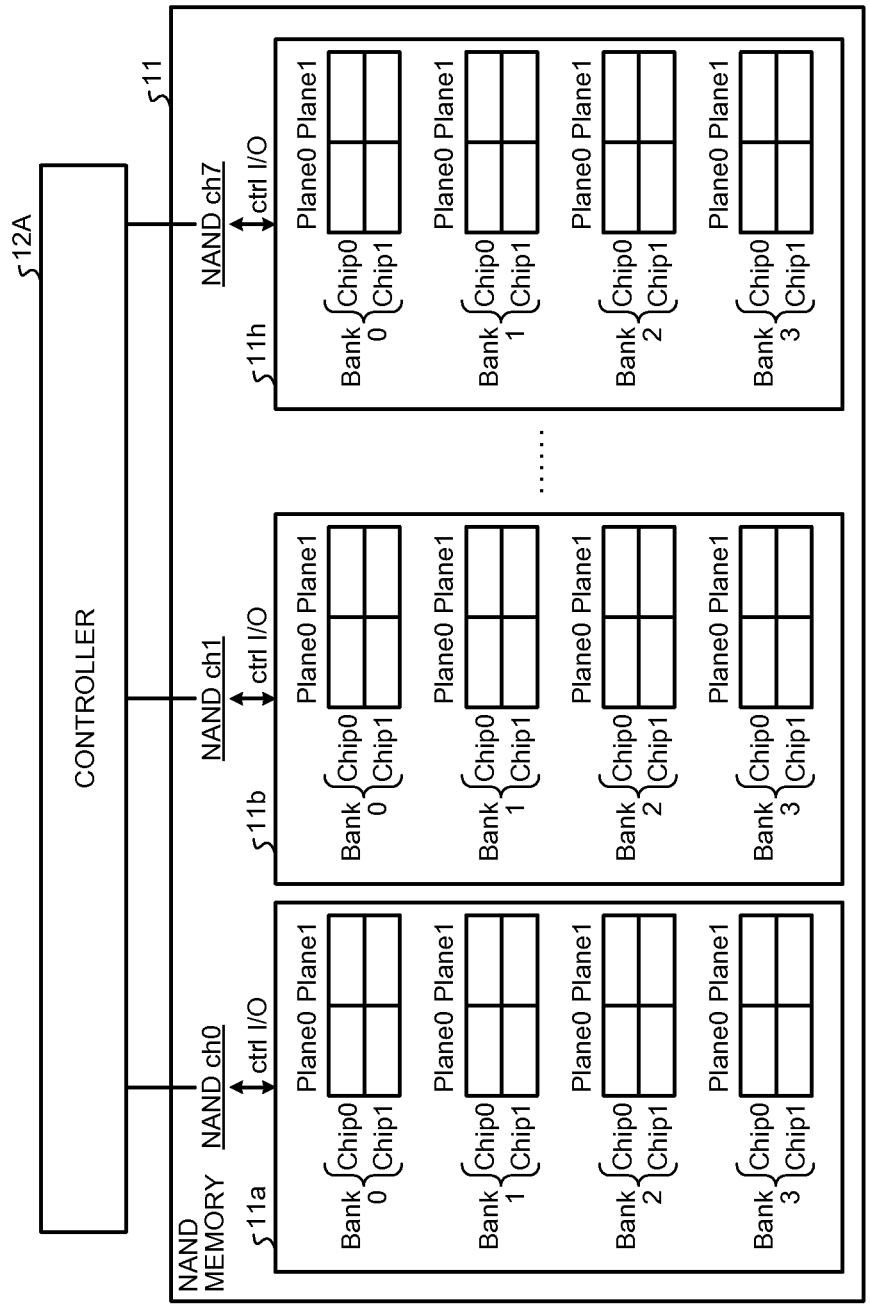
FIG. 3 is a diagram illustrating an example of the structure of a NAND memory according to the first embodiment.

Next, the structure of the NAND memory 11 which can be operated in parallel will be described. FIG. 3 is a diagram illustrating an example of the structure of the NAND memory according to the first embodiment. The NAND memory 11 according to this embodiment is connected in parallel to the controller 12A through eight channels (8ch: ch0 to ch7). According to this structure, in the memory system 10A, eight channel parallel operation elements 11a to 11h can be operated in parallel. The number of channels in the NAND memory 11 is not limited to 8, but any number of channels.

Each of the parallel operation elements 11a to 11h includes a plurality of banks (in this case, four banks Bank0 to Bank3) which can be interleaved. Each bank includes a plurality of memory chips (in this case, two memory chips Chip0 and Chip1). Each memory chip is divided into, for example, two districts Plane0 and Plane1 each having a plurality of physical blocks.

Plane0 and Plane1 include independent peripheral circuits (for example, a row decoder, a column decoder, a page buffer, and a data cache). In this structure, when the memory system 10A uses a plurality of planes in multi-plane mode, the memory system 10A can erase, write, or read the multiple planes simultaneously. Each memory chip may be divided into four planes or it may not be divided at all.

As such, in the NAND memory 11, a parallel operation can be performed by a plurality of channels, a parallel operation can be performed by a plurality of banks, and a parallel operation can be performed by a plurality of planes in multi-plane mode. When the number of channels is 8, the number of banks is 4, and the number of planes is 2, a maximum of 64 physical blocks can be operated in parallel.

Next, the use resources and the number of parallel operations set in the resource usage information 45X will be described. FIG. 4 is a diagram illustrating an example of the structure of the resource usage information according to the first embodiment. In the resource usage information 45X, the available resource ID and the number of parallel operations are associated with each other. FIG. 4 illustrates a case in which an available resource name is stored in the resource usage information 45X. However, the available resource name may be omitted.

In the resource usage information 45X, for example, an available resource ID "001" and the number of parallel operations $N_1$ are associated with each other. Therefore, the resource control unit 41 operates $N_1$ CPUs 51 corresponding to the available resource ID "001" among the CPUs 51 in parallel.

The use resources registered in the resource usage information 45X are, for example, a CPU, a NAND memory, a channel, a bank, a plane (not illustrated), a volatile memory, and a process.

The CPUs registered in the resource usage information 45X are, for example, the CPUs 51. The number of parallel operations $N_1$ of the CPUs is the number of CPUs which perform information processing using, for example, a lookup table (LUT). The LUT stores the correspondence relationship between a logical address and a physical address. The number of CPUs registered in the resource usage information 45X is, for example, 1 to 6.

The NAND memory registered in the resource usage information 45X is the NAND memory 11. The number of parallel operations $N_2$ of the NAND memory is, for example, the number of chips which are operated in parallel among the chips forming the NAND memory 11.

The channels registered in the resource usage information 45X are the channels of the NAND memory 11. The number of parallel operations $N_3$ of the channels is the number of channels which are operated in parallel among the channels. The number of channels registered in the resource usage information 45X is, for example, 1 to 8.

The banks registered in the resource usage information 45X are the banks of the NAND memory 11. The number of parallel operations $N_4$ of the banks is the number of banks which are operated in parallel among the banks. The number of banks registered in the resource usage information 45X is, for example, 1 to 4.

The volatile memory registered in the resource usage information 45X is, for example, the memory 52. The number of parallel operations $N_5$ of the volatile memories is the number of memories which are operated in parallel among the memories 52. The processes registered in the resource usage information 45X are, for example, processes related to reading or writing. The number of parallel operations $N_6$ of the processes is the number of processes (tasks) which are operated in parallel.

The use resources (the use resources which operate with the maximum number of parallel operations) which have no limit in the number of parallel operations may not be registered in the resource usage information 45X. In other words, only the use resources which have a limit in the number of parallel operations may be registered in the resource usage information 45X.

Next, the use resources which are set to the preset value and the number of use resources will be described. FIG. 5 is a diagram illustrating an example of the structure of the preset value table. In the preset value table 45B, the preset value and use limit information (the use resources and the number of parallel operations) are associated with each other.

For example, a preset value $P_1$, four CPUs 51 which are operated in parallel, and two NAND memories 11 which are operated in parallel are associated with each other. Therefore, when the preset value $P_1$ is designated by the host 60A, four CPUs 51 and two NAND memories 11 are operated in parallel in the memory system 10A.

The preset value table 45B is preset on the basis of, for example, the parallel operation of the memory system 10A and characteristics during a parallel operation. One or more use limit information items which give priority at least one of the endurance, performance, temperature, and power consumption of the memory system 10A are registered in the preset value table 45B. For example, use limit information which gives priority to random write and use limit information which gives priority to sequential write are set.

In the memory system 10A, when an operation starts, a performance control instruction is transmitted from the host 60A to the performance control interface 20A. The performance control instruction is, for example, the resource limit information, the preset value, the performance index, the endurance information, or the power consumption information.

The performance control interface 20A transmits the received performance control instruction to the CPU 51. Then, the CPU 51 updates the resource usage information 45X on the basis of the performance control instruction and the information table stored in the configuration table module 42A. Then, the resource control unit 41 controls the parallel operating resources 50 on the basis of the resource usage information 45X.

Then, in the memory system 10A, an operation corresponding to the performance control instruction transmitted from the host 60A is performed. In other words, in the memory system 10A, the performance, the amount of heat generated, endurance, power consumption, and temperature suitable for an operation environment are dynamically controlled. For example, the performance can be adjusted depending on the purpose of use of the storage server system to adjust the operation endurance of the memory system 10A.

In the memory system 10A, when a setting target value is the temperature or the communication speed, it is difficult to perform control in some cases. Therefore, the memory system 10A may give levels to the resources which can be operated in parallel and may perform a control process corresponding to the level.

For example, the parallel operation of the banks has four levels 1 to 4 (banks). In addition, the parallel operation of the channels has five levels 1, 2, 4, 8, and 16. The parallel operation of the CPUs 51 has six levels 1 to 6. The number of combinations of the parallel operations is the product of the levels. A level value suitable for an operation environment can be set empirically or by learning from the operation of the storage server system. For example, the result of each combination (level value) and the performance index are associated with each other. Therefore, when the performance index is designated, an operation is performed with the level value corresponding to the performance index.

In this embodiment, the performance control interface 20A includes a plurality of interfaces. However, the performance control interface 20A may include at least one interface. In addition, the configuration table module 42A may include tables corresponding to the interfaces in the performance control interface 20A.

In this embodiment, the memory system 10A controls the number of parallel operations of the resources. However, the memory system 10A may control, for example, the frequency of access to the resources or the waiting time. The waiting time for the resource is the intentionally inserted delay-slot before starting a predetermined process such as information processing or input-output processing, is performed in the memory system 10A. The delay-slot is controlled to change the performance of the memory system 10A. In addition, the host 60A may transmit an instruction to limit the resources which are operated in parallel in stages to the performance control interface 20A. In this case, the resource control unit 41 limits the resources which are operated in parallel in stages.

The host 60A may predict the necessary performance required for the memory system 10A, on the basis of the flow rate of data (the amount of data transmitted and received) per unit time or an event (for example, an outside temperature variation or a specific command). The host 60A predicts the performance required for the memory system 10A on the basis of, for example, at least one of the flow rate of data per unit time and an event. Then, the host 60A transmits a performance control instruction based on the predicted required performance to the memory system 10A. In other words, the host 60A predicts the required performance of the memory system 10A and transmits a performance control instruction corresponding to the prediction result to the memory system 10A.

In this embodiment, the memory system 10A performs an operation on the basis of the performance control instruction from the host 60A. However, when a predetermined condition is established, the memory system 10A may voluntarily perform the operation.

The host 60A may transmit resource limit information for limiting the storage capacity of the NAND memory 11 to the memory system 10A. For example, the host 60A may transmit, to the memory system 10A, resource limit information for limiting the storage capacity of the NAND memory 11 from 1 terabytes to 500 gigabytes. The host 60A can reduce the storage capacity of the NAND memory 11 to change a drive write per day (DWPD) which is one of the performance indexes. The DWPD is the ratio of the allowable amount of data written per day to the user capacity of the memory system 10A provided to the host 60A. In addition, the host 60A may transmit the DWPD as the performance index to the performance index setting interface 25c.

The host 60A may transmit resource limit information for adjusting an error correction level to the memory system 10A. In addition, an error correction circuit and the error correction level may be registered as the use resources in the resource usage information 45X.

As such, the memory system 10A according to the first embodiment includes the NAND memory 11, which is a non-volatile memory, and the controller 12A which controls the NAND memory 11. The controller 12A includes the performance control interface 20A which receives the performance control instruction from the host 60A. In addition, the controller 12A includes the resource control unit 41 which controls the memory system 10A on the basis of the performance control instruction. In the memory system 10A, the resource control unit 41 performs an operation corresponding to the performance control instruction transmitted from the host 60A.

Therefore, according to the first embodiment, the memory system 10A performs an operation corresponding to the performance control instruction transmitted from the host 60A. Therefore, it is possible to easily change the performance of the memory system 10A.

A control process corresponding to the temperature or power consumption is performed for the parallel operating resources 50. Therefore, it is possible to easily adjust an appropriate balance between the performance and the amount of heat generated so as to respond to a change in environment during the operation of the memory system 10A. In addition, it is possible to easily select whether to give priority to the endurance or the performance, on the basis of the purpose of use of the storage server system.

Second Embodiment

Next, a second embodiment will be described with reference to FIGS. 6 to 8. In a storage server system according to the second embodiment, a host transmits a performance control instruction on the basis of the internal temperature of a memory system. Then, the memory system performs an operation corresponding to the performance control instruction (required temperature information) related to the temperature from the host.

Figure 6:
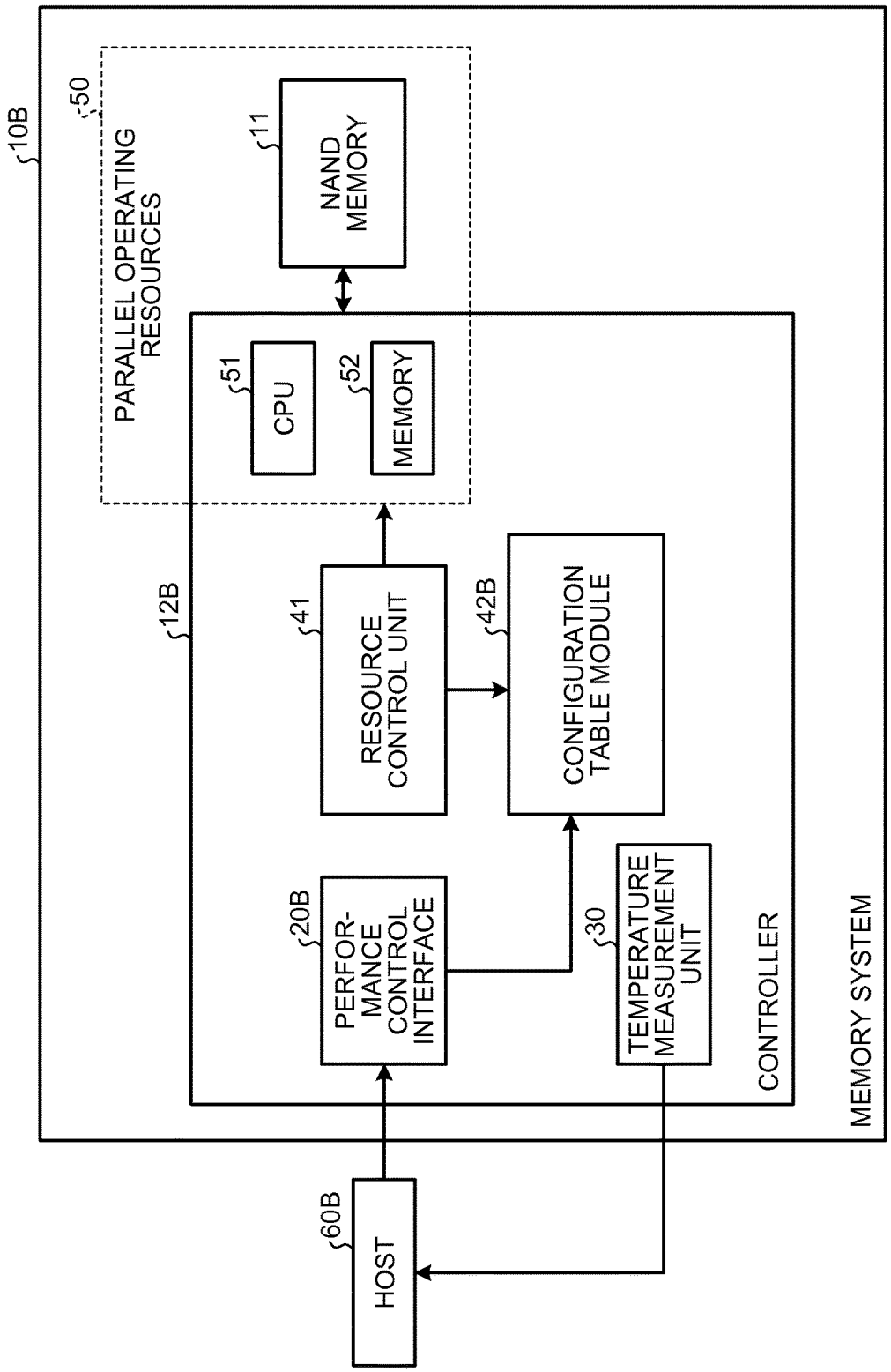
FIG. 6 is a diagram illustrating an example of the structure of a memory system according to a second embodiment.
Figure 7:
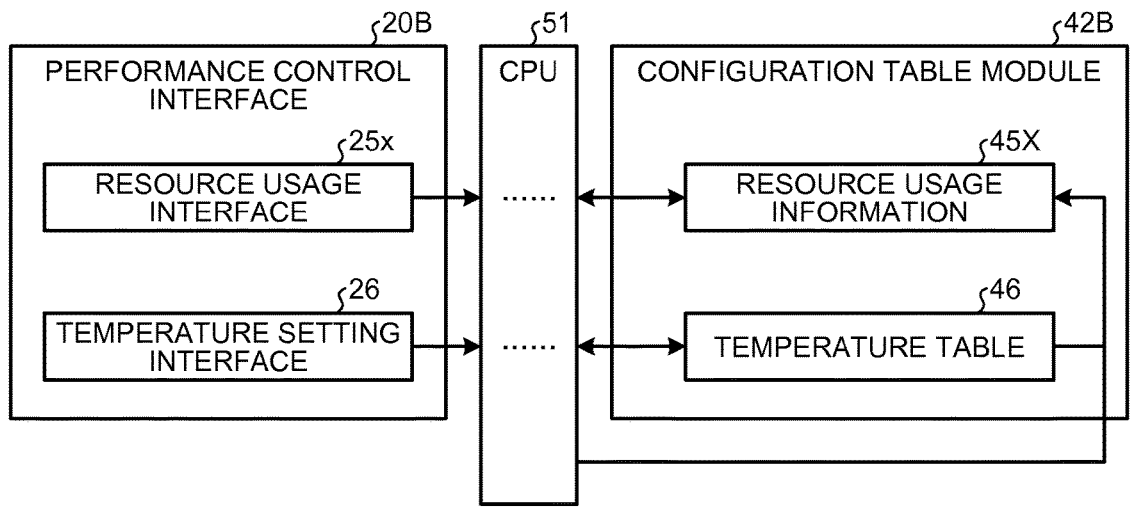
FIG. 7 is a diagram illustrating an example of the structure of a performance control interface and a configuration table module according to the second embodiment.

FIG. 6 is a diagram illustrating an example of the structure of the memory system according to the second embodiment. Among the components illustrated in FIG. 6, components having the same functions as those in the memory system 10A according to the first embodiment illustrated in FIG. 1 are denoted by the same reference numerals and the description thereof will not be repeated.

The storage server system according to the second embodiment includes a host 60B and a memory system 10B. The memory system 10B according to this embodiment controls the resources which can be operated in parallel, on the basis of required temperature information (performance control instruction) from the host 60B.

The memory system 10B includes a NAND memory 11 and a controller 12B. The controller 12B includes a performance control interface 20B, a resource control unit 41, and a configuration table module 42B. In addition, the controller 12B includes a CPU 51 and a memory 52.

Although not illustrated in FIG. 6, the CPU 51 is connected to the performance control interface 20B, the resource control unit 41, the configuration table module 42B, and the memory 52. Therefore, the performance control interface 20B is connected to the configuration table module 42B through the CPU 51. In addition, the performance control interface 20B is connected to the host 60B. The resource control unit 41 is connected to parallel operating resources 50 and the configuration table module 42B.

The performance control interface 20B receives a performance control instruction transmitted from the host 60B. Specifically, when receiving the performance control instruction, the performance control interface 20B transmits the performance control instruction to the CPU 51.

The configuration table module 42B stores various information tables. The configuration table module 42B stores resource usage information 45X and a temperature table 46 which will be described below.

The controller 12B according to this embodiment includes a temperature measurement unit 30. The temperature measurement unit 30 measures the internal temperature of the controller 12B or the internal temperature of the NAND memory 11. The temperature measurement unit 30 is connected to the host 60B and transmits the measurement result of the temperature to the host 60B. The temperature measurement unit 30 may be provided outside the controller 12B or outside the memory system 10B. The host 60B according to this embodiment transmits a performance control instruction corresponding to the measurement result of the temperature to the performance control interface 20B.

Next, the structure of the performance control interface 20B and the configuration table module 42B will be described. FIG. 7 is a diagram illustrating the structure of the performance control interface and the configuration table module according to the second embodiment. The performance control interface 20B includes a resource usage interface 25x and a temperature setting interface 26. The configuration table module 42B stores the resource usage information 45X and the temperature table 46. The temperature table 46 may be preset, for example, upon shipment of the memory system 10B or it may be changed by an instruction from the host 60B.

The temperature setting interface 26 receives the required temperature information transmitted from the host 60B and transmits the required temperature information to the CPU

51. The required temperature information is information for designating the maximum (upper limit) temperature of the memory system 10B. In the temperature table 46, the upper limit of the temperature required for the memory system 10B and the resource limit information of the resources of which parallel operation is limited are associated with each other. Therefore, the memory system 10B controls the parallel operations of the resources corresponding to the resource limit information in the temperature table 46 and operates at the temperature corresponding to the resource limit information.

In the memory system 10B, when an operation starts, the temperature measurement unit 30 measures the temperature of the controller 12B (NAND memory 11). Then, the temperature measurement unit 30 transmits the measurement result of the temperature to the host 60B. Then, the host 60B transmits a performance control instruction (required temperature information) corresponding to the measurement result of the temperature to the performance control interface 20B. The host 60B derives the required temperature information which is transmitted from the host 60B to the performance control interface 20B on the basis of, for example, the measurement result of the temperature. In addition, the required temperature information which is transmitted from the host 60B to the performance control interface 20B may be generated on the basis of an instruction from the user.

The performance control interface 20B transmits the received required temperature information to the CPU 51. Then, the CPU 51 updates the resource usage information 45X on the basis of the required temperature information and the temperature table 46. Then, the resource control unit 41 controls the parallel operating resources 50 on the basis of the resource usage information 45X.

In this way, in the memory system 10B, an operation corresponding to the performance control instruction transmitted from the host 60B is performed. In other words, in the memory system 10B, for example, the temperature or the amount of heat generated which is suitable for an operation environment is dynamically controlled.

Figure 8:
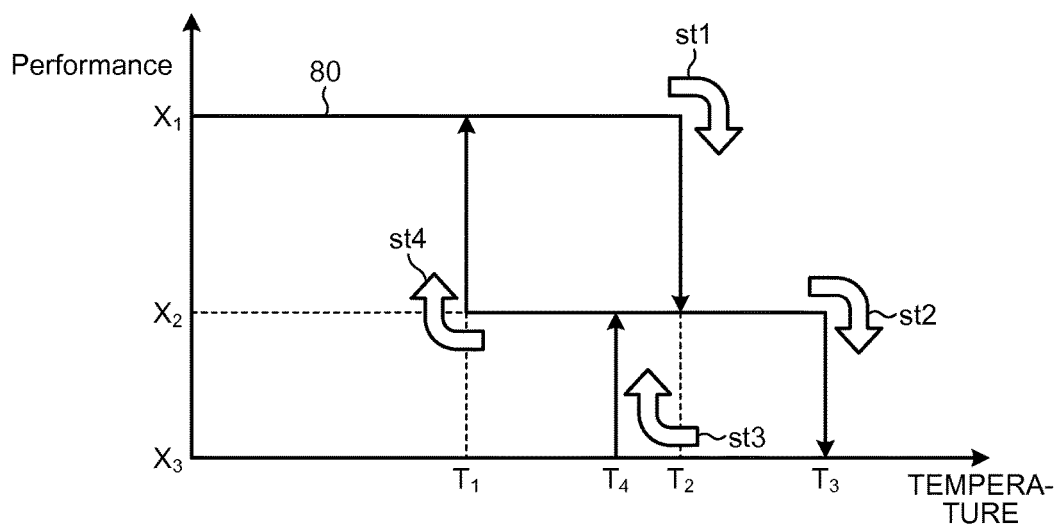
FIG. 8 is a diagram illustrating the relationship between the temperature and performance of the memory system according to the second embodiment.

FIG. 8 is a diagram illustrating the relationship between the temperature and the performance in the memory system according to the second embodiment. FIG. 8 illustrates temperature/performance characteristics 80 of the memory system 10B. In the graph illustrated in FIG. 8, the horizontal axis indicates the temperature of the memory system 10B and the vertical axis indicates the performance (parallelism) of the memory system 10B.

In the memory system 10B, when an operation is continuously performed in a normal state $X_1$, the temperature increases to $T_1$. In addition, when the operation is continuously performed, the temperature increases to $T_2$. The performance of the memory system 10B is adjusted to an adjusted state $X_2$, for example, at the time when the temperature increases to $T_2$ (st1). Specifically, the performance of the memory system 10B is degraded from the normal state $X_1$ to the adjusted state $X_2$.

Then, in the memory system 10B, when the operation is continuously performed in the adjusted state $X_2$, the temperature increases to $T_3$ in some cases. In this case, the memory system 10B changes to a shutdown state $X_3$ (st2). Then, in the memory system 10B, when the temperature is reduced to $T_4$ less than $T_2$ ($T_1 < T_4 < T_2$), the memory system 10B is adjusted to the adjusted state $X_2$ (st3). The magnitude relationship among $T_1$ to $T_4$ is not limited to the example illustrated in FIG. 8. For example, $T_4$ may be greater than $T_2$ or $T_4$ may be equal to $T_2$. In addition, $T_2$ may be equal to $T_3$ or $T_1$ may be equal to $T_4$.

In the memory system 10B, when the operation is continuously performed in the adjusted state $X_2$, the temperature is reduced to $T_1$ in some cases. In this case, the memory system 10B changes to the operation in the normal state $X_1$ (st4). In the memory system 10B, the process from (st1) to (st4) is performed according to a change in temperature.

The host 60B transmits a performance control instruction which can achieve the temperature/performance characteristics 80 to the memory system 10B. For example, the host 60B transmits parameters (for example, $T_1$ to $T_4$ and $X_1$ to $X_3$) for defining the curves (hysteresis) of st1 to st4 to the memory system 10B. The parameters for defining the curves of st1 to st4 may be registered in the memory system 10B in advance. In this case, the memory system 10B performs an operation corresponding to the temperature/performance characteristics 80, without receiving the performance control instruction from the host 60B.

The installation environment of the storage server system varies depending on an installation place, such as weather, a region, and air-conditioning equipment. Therefore, the amount of heat which can be dissipated from the memory system 10B varies depending on the memory system 10B. Therefore, there is a demand for controlling the amount of heat generated from the same storage server system according to an environment. In this embodiment, since the memory system 10B includes the temperature setting interface 26, it is possible to easily maintain the appropriate operation environment of the storage server system.

In this embodiment, the temperature measurement unit 30 transmits the measurement result of the temperature to the host 60B. However, the measurement result of the temperature may be transmitted to the host 60B through the performance control interface 20B. In addition, the performance control interface 20B may not include the resource usage interface 25x.

The host 60B may predict a temperature change on the basis of the measurement result of the temperature. In this case, the host 60B transmits a performance control instruction corresponding to the prediction result of the temperature change to the performance control interface 20B.

The memory system 10B may perform feedback control on the basis of the measurement result of the temperature such that the preset temperature or performance is obtained. In this case, the host 60B transmits a feedback parameter as the performance control instruction to the memory system 10B.

As such, the memory system 10B according to the second embodiment includes the temperature measurement unit 30. In the memory system 10B, the temperature measurement unit 30 transmits the measurement result of the temperature to the host 60B and the performance control interface 20B receives the performance control instruction (required temperature information) corresponding to the measurement result of the temperature from the host 60B. Then, in the memory system 10B, the resource control unit 41 performs an operation corresponding to the required temperature information from the host 60B.

Therefore, according to the second embodiment, the memory system 10B performs an operation with the resources corresponding to the required temperature information from the host 60B. Therefore, it is possible to easily change the temperature of the memory system 10B or the amount of heat generated from the memory system 10B.

Third Embodiment

Figure 10:
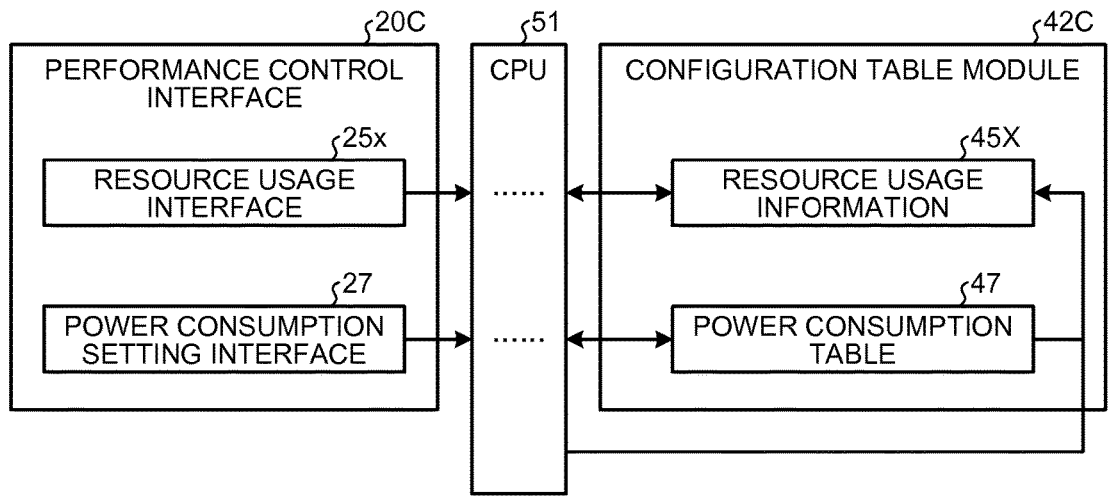
FIG. 10 is a diagram illustrating an example of the structure of a performance control interface and a configuration table module according to the third embodiment.
Figure 11:
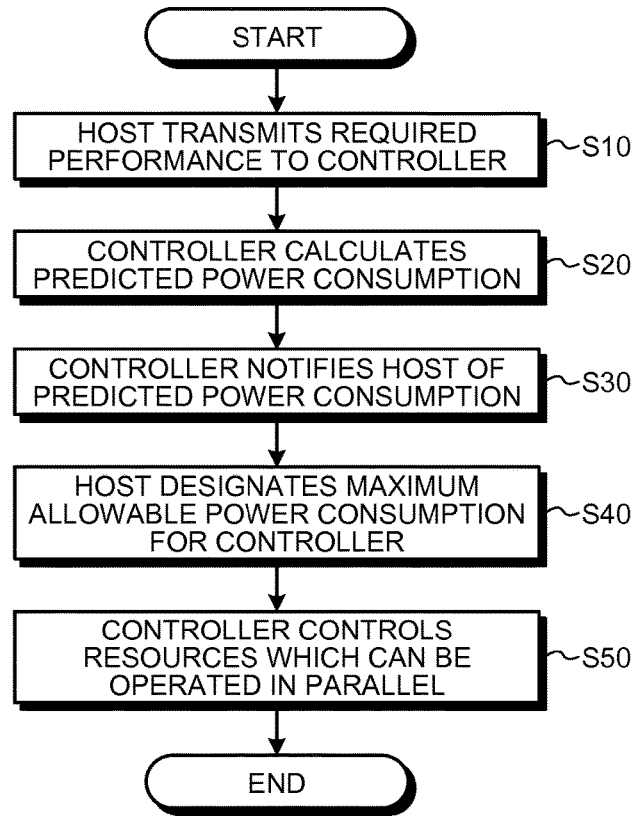
FIG. 11 is a flowchart illustrating the procedure of the operation of the memory system according to the third embodiment.

Next, a third embodiment will be described with reference to FIGS. 9 to 11. In a storage server system according to the third embodiment, a memory system calculates its power consumption (predicted power consumption which will be described below) on the basis of the required performance (for example, bandwidth or throughput) from the host. Then, the host transmits a performance control instruction related to power consumption to the memory system on the basis of the calculated predicted power consumption. The memory system performs an operation corresponding to the performance control instruction from the host.

Figure 9:
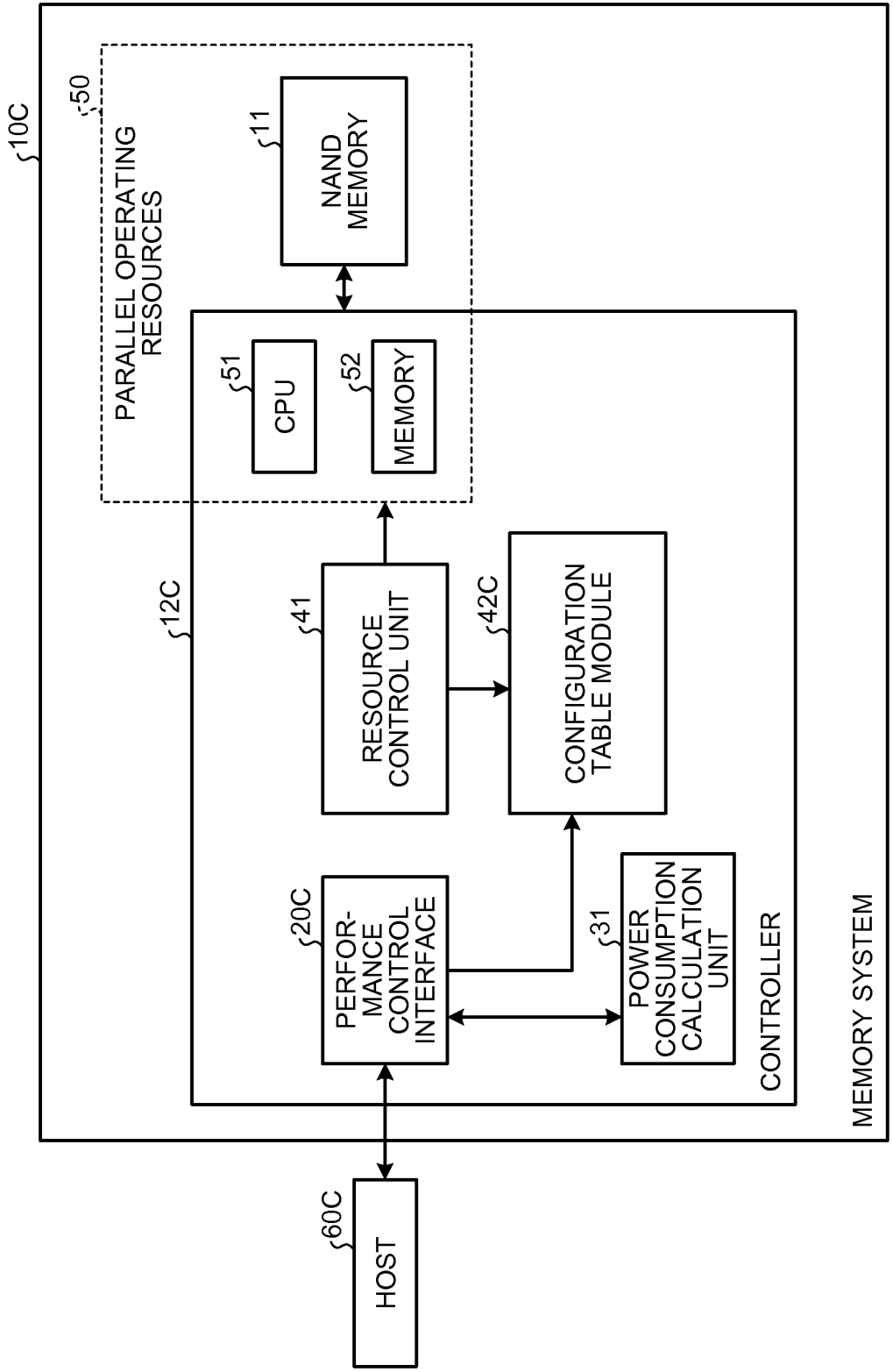
FIG. 9 is a diagram illustrating an example of the structure of a memory system according to a third embodiment.

FIG. 9 is a diagram illustrating an example of the structure of the memory system according to the third embodiment. Among the components illustrated in FIG. 9, components having the same functions as those in the memory systems 10A and 10B are denoted by the same reference numerals and the description thereof will not be repeated.

The storage server system according to the third embodiment includes a host 60C and a memory system 10C. The host 60C according to this embodiment transmits the required performances, such as the type of reading/writing operations, IOPS (the number of reading/writing operations per second), or MB/s (communication speed), to the memory system 10C. For example, the host 60C transmits the predetermined value of MB/s to the memory system 10C when sequential access is performed and transmits the predetermined value of the IOPS and a command size (TL: a transfer length; for example, 4 KB or 128 KB) to the memory system 10C when random access is performed.

When receiving predicted power consumption (watt) corresponding to the required performance from the memory system 10C, the host 60C transmits a performance control instruction (maximum allowable power consumption) corresponding to the received predicted power consumption to the memory system 10C.

The memory system 10C according to this embodiment controls the resources which can be operated in parallel on the basis of the performance control instruction from the host 60C. The memory system 10C includes a NAND memory 11 and a controller 12C.

The controller 12C includes a performance control interface 20C, a resource control unit 41, a configuration table module 42C, and a power consumption calculation unit 31. In addition, the controller 12C includes a CPU 51 and a memory 52.

Although not illustrated in FIG. 9, the CPU 51 is connected to the power consumption calculation unit 31, the performance control interface 20C, the resource control unit 41, the configuration table module 42C, and the memory 52. Therefore, the performance control interface 20C is connected to the configuration table module 42C through the CPU 51. In addition, the performance control interface 20C is connected to the host 60C and the power consumption calculation unit 31. The resource control unit 41 is connected to parallel operating resources 50 and the configuration table module 42C.

The performance control interface 20C receives the required performance transmitted from the host 60C. Specifically, the performance control interface 20C transmits the required performance, such as throughput, received from the host 60C to the power consumption calculation unit 31.

The performance control interface 20C receives the performance control instruction transmitted from the host 60C. Specifically, when receiving power consumption (maximum allowable power consumption which will be described below) which is the performance control instruction, the performance control interface 20C transmits the maximum allowable power consumption to the CPU 51. The configuration table module 42C stores resource usage information 45X and a power consumption table 47 which will be described below.

The controller 12C includes the power consumption calculation unit 31. The power consumption calculation unit 31 calculates predicted power consumption corresponding to the required performance from the host 60C. The power consumption calculation unit 31 calculates the predicted power consumption corresponding to the required performance, using, for example, an information table (not illustrated) in which the required performance and power consumption are associated with each other. The information table used by the power consumption calculation unit 31 is an information table which is set for each memory system 10C. Therefore, the power consumption calculation unit 31 calculates the predicted power consumption of the memory system 10C. The information table used by the power consumption calculation unit 31 is set for each memory system 10C, for example, when the memory system 10C is manufactured.

The power consumption calculation unit 31 transmits the predicted power consumption corresponding to the required performance to the host 60C through the performance control interface 20C. The power consumption calculation unit 31 may transmit the predicted power consumption corresponding to the required performance to the host 60C, without passing through the performance control interface 20C.

Next, the structure of the performance control interface 20C and the configuration table module 42C will be described. FIG. 10 is a diagram illustrating the structure of the performance control interface and the configuration table module according to the third embodiment. The performance control interface 20C includes a resource usage interface 25x and a power consumption setting interface 27. The configuration table module 42C stores the resource usage information 45X and the power consumption table 47. The power consumption table 47 may be preset, for example, upon shipment of the memory system 10C or it may be changed by an instruction from the host 60C.

The power consumption setting interface 27 transmits the required performance transmitted from the host 60C to the power consumption calculation unit 31. In addition, the power consumption setting interface 27 transmits a performance control instruction for the maximum allowable power consumption transmitted from the host 60C to the CPU 51.

The required performance transmitted from the host 60C is information for designating the performance of the memory system 10C. The performance control instruction transmitted from the host 60C is information for designating the maximum allowable power consumption of the memory system 10C.

In the power consumption table 47, the maximum allowable power consumption required for the memory system 10C is associated with the resource limit information of the resources of which parallel operation is limited. Therefore, the memory system 10C controls the parallel operation of the resources corresponding to the resource limit information stored in the power consumption table 47 and operates with the maximum allowable power consumption corresponding to the resource limit information.

Next, the procedure of the operation of the memory system 10C will be described. FIG. 11 is a flowchart illustrating the procedure of the operation of the memory system according to the third embodiment. In the storage server system including the memory system 10C, when an operation starts, the host 60C transmits the required performance to the controller 12C (Step S10). The power consumption setting interface 27 receives the required performance from the host 60C and transmits the required performance to the power consumption calculation unit 31.

Then, the power consumption calculation unit 31 of the controller 12C calculates predicted power consumption corresponding to the required performance (Step S20). Then, the controller 12C notifies the calculated predicted power consumption to the host 60C through the power consumption setting interface 27 (Step S30).

Then, the host 60C designates the maximum allowable power consumption allowed to the memory system 10C on the basis of the predicted power consumption from the controller 12C and transmits the maximum allowable power consumption to the performance control interface 20C of the controller 12C. In other words, the host 60C designates the maximum allowable power consumption of the controller 12C (Step S40). The host 60C designates the maximum allowable power consumption which is transmitted from the host 60C to the performance control interface 20C on the basis of, for example, the predicted power consumption from the controller 12C. The maximum allowable power consumption which is transmitted from the host 60C to the performance control interface 20C may be generated on the basis of an instruction from the user.

The performance control interface 20C transmits the received maximum allowable power consumption to the CPU 51. Then, the CPU 51 updates the resource usage information 45X on the basis of the maximum allowable power consumption and the power consumption table 47. Then, the resource control unit 41 controls the parallel operating resources 50 on the basis of the resource usage information 45X (Step S50).

In this way, in the memory system 10C, an operation corresponding to the performance control instruction from the host 60C is performed. In other words, in the memory system 10C, power consumption suitable for an operation environment is dynamically controlled.

The host 60C may designate the maximum allowable power consumption, without receiving the maximum allowable power consumption calculated by the controller 12C. In this case, the host 60C may transmit the designated maximum allowable power consumption to the CPU 51, without passing through the performance control interface 20C. In addition, the performance control interface 20C may not include the resource usage interface 25x.

As such, the memory system 10C according to the third embodiment includes the power consumption calculation unit 31. The host 60C transmits the required performance to the memory system 10C. In the memory system 10C, the power consumption calculation unit 31 calculates predicted power consumption corresponding to the required performance and transmits the predicted power consumption to the host 60C. When the performance control interface 20C receives the performance control instruction (power consumption instruction) designating the maximum allowable power consumption from the host 60C, the resource control unit 41 performs an operation corresponding to the maximum allowable power consumption instruction from the host 60C.

Therefore, according to the third embodiment, the memory system 10C performs an operation with the resources corresponding to the maximum allowable power consumption designated by the host 60C. Therefore, it is possible to easily change the power consumption of the memory system 10C.

Fourth Embodiment

FIG. 12 is a diagram illustrating an example of the mounting of a memory system. Here, a case in which the memory system 10A is mounted will be described. The memory systems 10B and 10C have the same mounting structure as the memory system 10A.

The memory system 10A is mounted in, for example, a server system 100. The server system 100 has a structure in which a disk array 200 and a rack-mount server 300 are connected to each other by a communication interface 400. The communication interface 400 can have any standard. The rack-mount server 300 includes one or more hosts 60A mounted on a server rack. The disk array 200 includes one or more memory system 10A and one or more hard disk units 4 which are mounted on a server rack. The disk array 200 includes a power supply 3 and the power supply 3 supplies power to each unit mounted on the disk array 200 through a backplane (not illustrated). In the disk array 200, for example, one or more memory systems 10A are used as caches of one or more hard disk units 4. In the disk array 200, a storage controller unit (not shown) may be mounted which is forming a RAID over one or more hard disk units 4.

In recent years, there has been a demand for a technique which matches the performances of the drivers of the server systems in order to mount the drivers with difference performances in the server systems of the same model. In addition, there has been a demand for a technique which suppresses the performance of a new-generation high-performance drive and mounts the new-generation high-performance drive in a previous-generation server system. This is because there is a demand for a technique which reduces costs, ensures components, and improves maintainability, without changing the performance of the server system. In addition, since there is a tradeoff relation between the performance and endurance of an SSD, there is a demand for adjusting the performance and endurance according to the purpose of use of the server system.

There is a method which defines a temporal delay in a data path when a drive is manufactured and statically adjusts the performance of the drive. In this method, whenever the performance is adjusted, it is necessary to remanufacture the drive or to update the firmware of the drive. Therefore, it takes a lot of time and effort to set the optimal performance value.

In addition, there is a method in which a drive detects a change in a predetermined environment (for example, a high temperature environment) and voluntarily limits the resources to be accessed. In this method, since the limit of the resources is determined for each drive, it is difficult to achieve the same performance between a plurality of drives.

The memory systems 10A to 10C according to the first to third embodiments can change the performances with ease in response to the requests from the hosts 60A to 60C, respectively. Therefore, even when the server system 100 is formed by different types of memory systems, it is possible to unify the performances of the memory systems and to obtain the server system 100 with the same performance.

For example, when a first server system 100 is formed using the memory system 10A and a second server system 100 is formed using the memory system 10B, the performance of the memory system 10A is adjusted to be the same as the performance of the memory system 10B. Therefore, the first server system 100 and the second server system 100 have the same performance. As such, different generations of drives with different performances or drivers with different performances which are provided from different vendors can be mounted in the same server system.

As such, according to the fourth embodiment, the memory systems 10A to 10C perform operations at the performances designated by the hosts 60A to 60C, respectively. Therefore, even when the drivers with different performances are provided in the server system 100, it is possible to equalize the performances between the server systems 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory; and
a controller configured to control the non-volatile memory,
wherein the controller includes:
an interface configured to receive from a host, a first instruction as a performance control instruction, the first instruction including information and being an instruction that changes a performance of the memory system;
a control unit configured to control the memory system on the basis of the performance control instruction received from the host such that a number of parallel operations of parallel operating units that are able to operate in parallel in the memory system is changed; and
a table module configured to store corresponding information in which a control method corresponding to the performance control instruction is set, the corresponding information being set for the memory system,
wherein the control unit selects the control method corresponding to the received performance control instruction on the basis of the received performance control instruction and the corresponding information stored in the table module, and changes the number of parallel operations of the parallel operating units according to the selected control method.

2. The memory system according to claim 1,
wherein, in the performance control instruction, a type and the number of parallel operations of the parallel operating units to be changed are designated, and
the control unit changes the number of parallel operations of the parallel operating units designated by the received performance control instruction.

3. The memory system according to claim 1,
wherein the control unit controls the memory system by using the selected control method on the basis of the received performance control instruction and the stored corresponding information.

4. The memory system according to claim 1,
wherein the control method is a type and a number of parallel operating units which are operated in parallel, and
the performance control instruction includes a preset value designating the control method.

5. The memory system according to claim 3,
wherein the control method is a type and a number of parallel operating units which are operated in parallel, and
the performance control instruction includes a preset value designating the control method.

6. The memory system according to claim 1,
wherein the performance control instruction includes a maximum value of the performance of the memory system requested by the host.

7. The memory system according to claim 1,
wherein the performance control instruction includes a minimum endurance of the memory system requested by the host.

8. The memory system according to claim 1,
wherein the performance control instruction includes a maximum power consumption of the memory system requested by the host.

9. The memory system according to claim 1,
wherein the performance control instruction includes an upper limit of a temperature of the memory system requested by the host.

10. The memory system according to claim 1,
wherein the performance control instruction is an instruction to designate a duration of a waiting time when the memory system performs a process.

11. The memory system according to claim 1,
wherein the control unit increases or decreases the number of parallel operations in two or more stages, the parallel operations being operated in parallel by the parallel operating units.

12. The memory system according to claim 1,
wherein the host predicts a required performance of the memory system on the basis of at least one of a predetermined event, and an amount of data transmitted or received between the host and the memory system per unit time, and transmits the performance control instruction corresponding to the prediction to the controller.

13. The memory system according to claim 1, further comprising:
a first temperature measurement unit configured to measure a temperature of the non-volatile memory,
wherein, when receiving a second instruction which is transmitted from the host to the memory system, the controller transmits a measurement result of the temperature to the host, and
the controller receives the performance control instruction based on the measurement result of the temperature from the host.

14. The memory system according to claim 1, further comprising:
a second temperature measurement unit configured to measure a temperature of the non-volatile memory or the controller,
wherein the controller performs feedback control on the memory system on the basis of a measurement result of the temperature.

15. A memory system comprising:
a non-volatile memory; and
a controller configured to control the non-volatile memory,
wherein the controller includes:
a calculation unit configured to predict power consumption corresponding to a required performance received from a host and to transmit the predicted power consumption to the host;
an interface configured to receive from the host, a power consumption instruction in which a maximum allowable power consumption of the memory system is designated;
a control unit configured to control the memory system on the basis of the power consumption instruction received from the host such that a number of parallel operations of parallel operating units that are able to operate in parallel in the memory system is changed; and
a table module configured to store corresponding information in which a control method corresponding to the power consumption instruction is set, the corresponding information being set for the memory system,
wherein the control unit selects the control method corresponding to the received power consumption instruction on the basis of the received power consumption instruction and the corresponding information stored in the table module, and changes the number of parallel operations of the parallel operating units according to the selected control method.

16. The memory system according to claim 15,
wherein the control method is a type and a number of parallel operating units which are operated in parallel, and
the power consumption instruction includes a preset value designating the control method.

\* \* \* \* \*